United States Patent
Suzuki et al.

(10) Patent No.: US 8,834,962 B2
(45) Date of Patent: Sep. 16, 2014

(54) METHODS FOR IMPROVING THE STRENGTH OF GLASS SUBSTRATES

(75) Inventors: Shoji Suzuki, San Jose, CA (US); Chris Brisko, San Jose, CA (US)

(73) Assignee: WD Media, LLC, San Jose, CA (US)

( * ) Notice: Subject to any disclaimer, the term of this patent is extended or adjusted under 35 U.S.C. 154(b) by 131 days.

(21) Appl. No.: 13/153,320

(22) Filed: Jun. 3, 2011

(65) Prior Publication Data

US 2012/0308722 A1    Dec. 6, 2012

(51) Int. Cl.
| | | |
|---|---|---|
| *B05D 5/12* | (2006.01) | |
| *C03C 21/00* | (2006.01) | |
| *C03C 17/22* | (2006.01) | |

(52) U.S. Cl.
CPC .............. *C03C 17/22* (2013.01); *C03C 21/008* (2013.01)
USPC ........................................ 427/131

(58) Field of Classification Search
CPC .................................. B05D 3/04; B05D 1/18
USPC ........................................ 427/131
See application file for complete search history.

(56) References Cited

U.S. PATENT DOCUMENTS

| | | | | |
|---|---|---|---|---|
| 3,498,773 A | * | 3/1970 | Grubb et al. ................. | 65/30.14 |
| 3,697,242 A | * | 10/1972 | Shoneberger et al. ....... | 65/30.14 |
| 4,206,253 A | * | 6/1980 | Watanabe ..................... | 65/30.14 |
| 4,469,628 A | * | 9/1984 | Simmons et al. ............. | 588/11 |
| 5,084,517 A | * | 1/1992 | Hallden-Abberton ........ | 525/183 |
| 5,209,767 A | | 5/1993 | Maltby, Jr. et al. | |
| 5,576,282 A | | 11/1996 | Miracle et al. | |
| 5,643,649 A | | 7/1997 | Hagan et al. | |
| 5,654,057 A | * | 8/1997 | Kitayama et al. ............ | 428/64.1 |
| 5,681,609 A | | 10/1997 | Kitayama et al. | |
| 5,686,014 A | | 11/1997 | Baillely et al. | |
| 5,733,622 A | | 3/1998 | Starcke et al. | |
| 5,910,371 A | | 6/1999 | Francel et al. | |
| 5,916,656 A | | 6/1999 | Kitayama et al. | |
| 6,363,599 B1 | | 4/2002 | Bajorek | |
| 6,374,640 B1 | | 4/2002 | Fotheringham et al. | |
| 6,395,634 B1 | | 5/2002 | Miyamoto | |
| 6,638,623 B2 | * | 10/2003 | Jensen et al. ................. | 428/410 |
| 6,673,474 B2 | | 1/2004 | Yamamoto | |
| 6,801,397 B2 | | 10/2004 | Yamamoto et al. | |

(Continued)

FOREIGN PATENT DOCUMENTS

| | | |
|---|---|---|
| DE | 2422527 | 11/1975 |
| JP | 02301017 | 12/1990 |
| KR | 100866844 | 11/2008 |

OTHER PUBLICATIONS

Haldimann, "Structural Use of Glass", 2008, IABSE, pp. 9-12.

(Continued)

*Primary Examiner* — Michael Wieczorek
*Assistant Examiner* — Sarah R Anderson

(57) ABSTRACT

Methods for improving the strength of glass substrates are described. One such method for strengthening a glass disk substrate for a storage device includes immersing at least a portion of the glass substrate in a solution, the solution including a solvent and a coating material selected from the group consisting of NaOH, KOH, and $KNO_3$, removing the glass substrate from the solution, allowing the solvent to evaporate from the glass substrate, and heating the glass substrate at a preselected temperature for a preselected duration, where the preselected temperature is sufficient to substantially melt the coating material and is less than a transition temperature of the glass substrate.

18 Claims, 4 Drawing Sheets

(56) References Cited

U.S. PATENT DOCUMENTS

| | | |
|---|---|---|
| 6,908,870 B2 | 6/2005 | Kawai |
| 7,001,669 B2 | 2/2006 | Lu et al. |
| 7,040,953 B2 | 5/2006 | Matsuno et al. |
| 7,703,303 B2 | 4/2010 | Isono et al. |
| 8,206,789 B2 | 6/2012 | Suzuki |
| 8,316,668 B1 | 11/2012 | Chan et al. |
| 2001/0029752 A1 | 10/2001 | Natan et al. |
| 2003/0077982 A1 | 4/2003 | Takizawa |
| 2003/0096078 A1 | 5/2003 | Horisaka et al. |
| 2003/0109202 A1* | 6/2003 | Matsuno et al. .......... 451/41 |
| 2005/0096210 A1 | 5/2005 | Kawai |
| 2005/0223744 A1 | 10/2005 | Horisaka et al. |
| 2006/0286550 A1 | 12/2006 | Montagu et al. |
| 2007/0039353 A1 | 2/2007 | Kamiya |
| 2007/0104922 A1 | 5/2007 | Zhai et al. |
| 2007/0142498 A1 | 6/2007 | Brennan et al. |
| 2007/0178305 A1 | 8/2007 | Papazoglou |
| 2007/0238174 A1 | 10/2007 | Cousins et al. |
| 2008/0028986 A1 | 2/2008 | Futterer et al. |
| 2008/0043301 A1 | 2/2008 | Lewis |
| 2008/0085412 A1 | 4/2008 | Ortiz |
| 2009/0057661 A1 | 3/2009 | Siddiqui et al. |
| 2009/0098366 A1 | 4/2009 | Smoukov et al. |
| 2009/0104369 A1 | 4/2009 | Rajala et al. |
| 2009/0118113 A1 | 5/2009 | Yagi |
| 2009/0202816 A1 | 8/2009 | Schlenoff |
| 2009/0247694 A1 | 10/2009 | Kritzer et al. |

OTHER PUBLICATIONS

Machine Translation of Korean Patent Document KR866844, performed KIPO website May 2, 2013, 24 pages.

* cited by examiner

METHODS FOR IMPROVING THE STRENGTH OF GLASS SUBSTRATES

FIELD

The present invention relates to information storage technology, and more specifically to methods for improving the strength of glass substrates that are used in storage devices.

BACKGROUND

The mechanical strength of disk shaped glass substrates is primarily determined by micro cracks existing at inner diameter edges. These cracks are typically on the order of 1 to 100 µm in depth. They are generated during machining processes such as coring or grinding to shape the chamfer edges of the substrates. Conventional treatments to improve the strength of glass substrates involve removing those cracks by polishing with a brush and ceria slurry, or by replacing the native alkaline ions such as Na or Li with bigger ions such as K in a molten salt bath using a process known as chemical strengthening. For chemical strengthening processes, generally only glass which has suitable composition of alkaline atoms can be used. Materials such as $KNO_3$, $NaNO_3$, or a combination thereof are commonly used for chemical strengthening. The above referenced ion implantation technique generally does not rely on the ion exchange. As such, glass with less alkaline ions can be treated, and these techniques can also be used to generate compressive stress without the ion exchange by immersing the glass article into a molten KOH or LiOH bath or by exposing the article to a vapor form of KOH or LiOH. However, these conventional processes are often expensive and somewhat inefficient. As such, an improved process for strengthening glass substrates is needed.

SUMMARY

Aspects of the invention relate to methods for improving the strength of glass substrates that are used in storage devices. In one embodiment, the invention relates to a method for strengthening a glass disk substrate for a storage device, the method including immersing at least a portion of the glass substrate in a solution, the solution including a solvent and a coating material selected from the group consisting of NaOH, KOH, and $KNO_3$, removing the glass substrate from the solution, allowing the solvent to evaporate from the glass substrate, and heating the glass substrate at a preselected temperature for a preselected duration, where the preselected temperature is sufficient to substantially melt the coating material and is less than a transition temperature of the glass substrate.

DETAILED DESCRIPTION

Figure 1A:
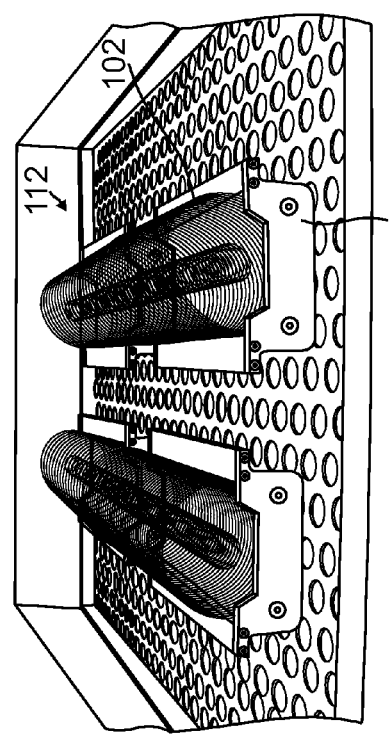
FIG. 1a-1d are perspective views of stages of a process for strengthening glass substrates in accordance with one embodiment of the invention.

Referring now to the drawings, processes for strengthening glass substrates are illustrated. The strengthening processes immerse the glass substrates in a solution containing a solvent such as water and a coating material such as NaOH, KOH, and/or $KNO_3$. The glass substrates are removed from the solution and allowed to sit until the solvent evaporates from the substrates. The glass substrates are then heated to a preselected temperature for a preselected duration, where the preselected temperature is sufficient to substantially melt the coating material but is also less than the transition temperature of the glass substrates.

In several embodiments, the glass substrates are then rapidly cooled using a gas cooling or liquid cooling technique. In some embodiments, the glass substrates are aluminosilicate glass or borosilicate glass. In a number of embodiments, the glass substrates are configured for use in a digital storage device such as a hard drive.

FIG. 1a-1d are perspective views of four stages of a process for strengthening glass substrates in accordance with one embodiment of the invention.

FIG. 1a is a perspective view of a first process cassette 100 containing a number of glass substrates 102 positioned in a spaced apart configuration in accordance with one embodiment of the invention. The first process cassette 100 includes a number of slots 104 that are spaced apart, where each slot 104 is configured to receive and retain one glass substrate 102. The first process cassette 100 can be made of a ceramic material or another material configured to withstand repeated exposures to a coating material. The glass substrates can be made of aluminosilicate glass, borosilicate glass, or another glass substrate material suitable for use in a magnetic storage device. The glass substrates are thin disk shaped substrates with a hole in the center (e.g., having a similar shape to a washer).

Figure 1D:
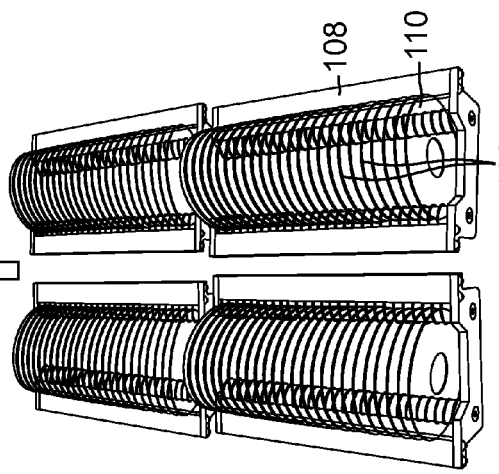
Figure 1B:
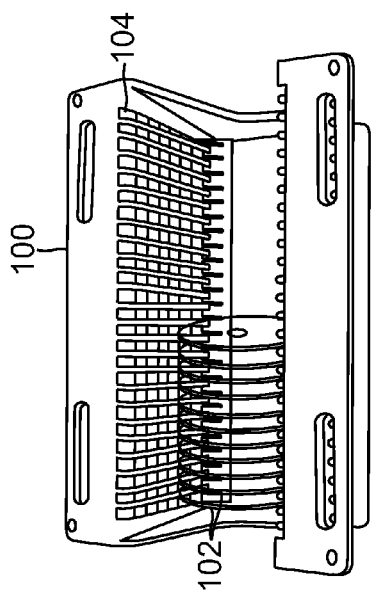

FIG. 1b is a perspective view of the first process cassette 100, and glass substrates 102 mounted therein, immersed in a solution 106 containing water, acting as a solvent, and a coating material such as NaOH, KOH, and/or $KNO_3$ in accordance with one embodiment of the invention. In one embodiment, the solution contains NaOH having a concentration of about 48 percent or greater. In the embodiment illustrated in FIGS. 1a and 1b, the first process cassette 100 is about half full of the glass substrates 102. In other embodiments, the first process cassette 100 can be more than or less than half full. In the embodiment illustrated in FIG. 1b, the first process cassette 100 is only partially submerged in the solution 106. However, in other embodiments, a greater amount of the solution 106 can be used to further submerge the first process cassette 100, or a smaller amount of the solution 106 can be used to submerge a smaller portion of the first process cassette 100. In the embodiment illustrated in FIG. 1b, the solvent is water. In other embodiments, the solvent can be methanol, ethanol, or another suitable solvent.

Figure 1C:
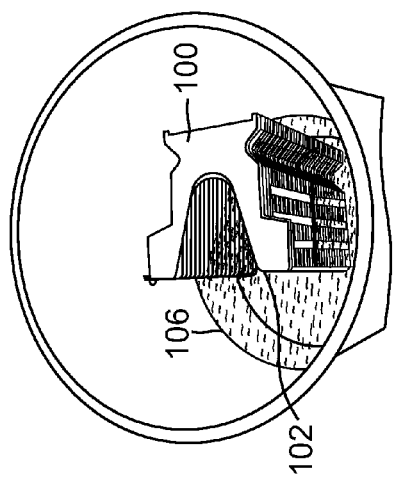

FIG. 1c is a perspective view of the glass substrates 102 mounted within a second process cassette 108 in a spaced apart configuration to allow the water from the solution 106 to evaporate in accordance with one embodiment of the invention. The second process cassette 108 includes a number of slots 110 that are spaced apart, where each slot 110 is configured to receive and retain one glass substrate 102. The second process cassette 108 can be made of a metallic material or another material configured to withstand repeated exposures to substantial heat on the order of 400 degrees Celsius. In several embodiments, the coating material in the solution 106 forms a film on the glass substrates after the water has evaporated.

FIG. 1d is a perspective view of the second process cassette 108, and glass substrates 102 mounted therein, in a heating chamber 112 in accordance with one embodiment of the invention. The glass substrates 102 can be heated in the heating chamber 112 at a preselected temperature for a preselected duration. In one embodiment, for example, the glass substrates 102 are heated at 380 degrees Celsius for about 2 hours. In one embodiment, the preselected temperature is in a range from about 320 to about 380 degrees Celsius. In one embodiment, the preselected duration is in a range from about 30 minutes to about 4 hours. In one embodiment, the glass substrates are made of aluminosilicate and the preselected temperature is about 370 degrees Celsius. In several embodiments, the coating material melts and molecules thereof migrate into the surfaces of the glass substrates. The additional molecules can generate compressive stress within the glass substrates and thereby strengthen the substrates.

In several embodiments, the glass substrates 102 are removed from the heating chamber 112 and rapidly cooled. In some embodiments, the glass substrates 102 are rinsed and/or cleaned. In a number of embodiments, the glass substrates are configured for use in a digital storage device such as a hard drive. In such case, they are prepared for one or more manufacturing processes for depositing magnetic materials onto the glass substrates. In several embodiments, each glass substrate provides a base layer for a magnetic storage disk for storing digital information.

Figure 2:
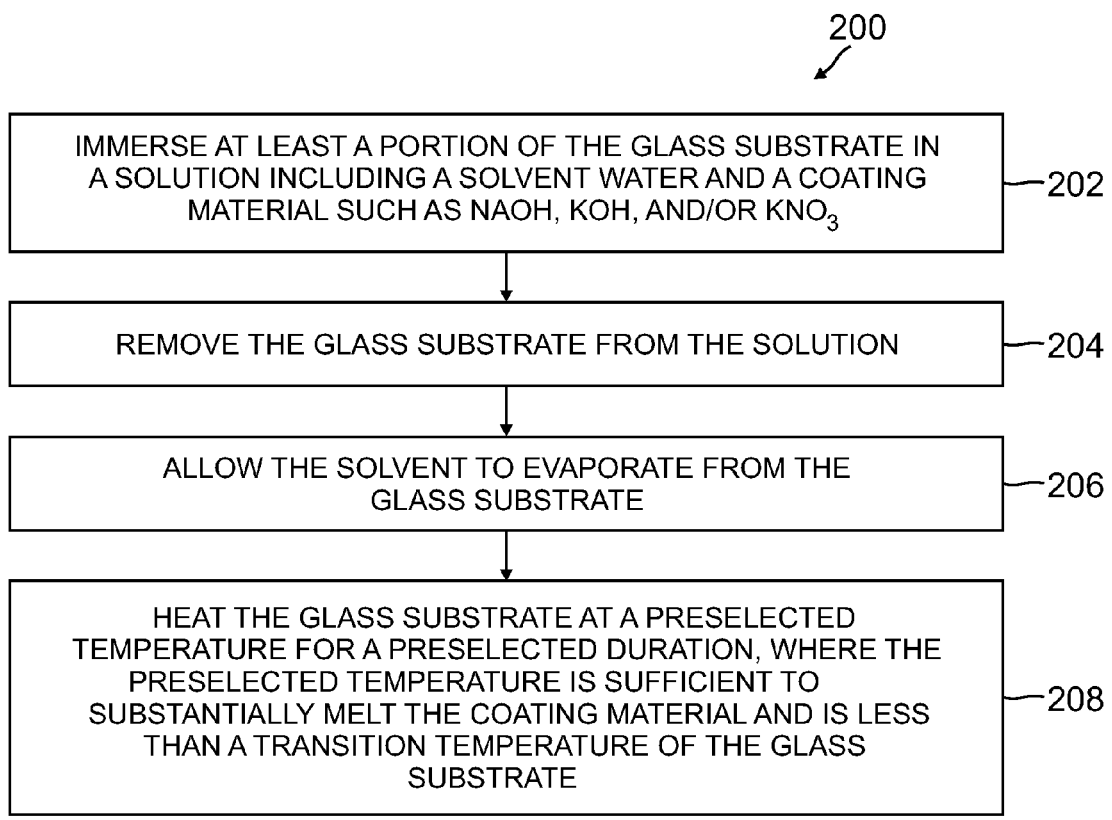
FIG. 2 is a flowchart of a process for strengthening glass substrates in accordance with one embodiment of the invention.

FIG. 2 is a flowchart of a process 200 for strengthening glass substrates in accordance with one embodiment of the invention. In particular embodiments, process 200 can be used in conjunction with, or in alternative to, the process of FIGS. 1a-1d. The process first immerses (202) at least a portion of the glass substrate in a solution including a solvent (e.g., water) and a coating material such as NaOH, KOH, and/or KNO$_3$. In several embodiments, the glass substrate is completely immersed in the solution. The process then removes (204) the glass substrate from the solution. The process allows (206) the solvent to evaporate from the glass substrate. In several embodiments, the glass substrate may be moved from an immersion process cassette to a heating process cassette. The process then heats (208) the glass substrate at a preselected temperature for a preselected duration, where the preselected temperature is sufficient to substantially melt the coating material and is less than a transition temperature of the glass substrate.

In several embodiments, the glass substrates are made of aluminosilicate glass, borosilicate glass, or another glass substrate material suitable for use in a storage device. While not bound by any particular theory, the transition temperature of borosilicate glass is believed to be about 640 degrees Celsius. The transition temperature of aluminosilicate glass is believed to be about 515 degrees Celsius. However, these transition temperatures are just examples for particular compositions of materials including borosilicate and aluminosilicate. In other embodiments, the glass substrates made of borosilicate or aluminosilicate glass can have other transitions temperatures depending on the composition of materials used therein. In addition, although the processes described herein are discussed in certain instances as being used in conjunction with borosilicate or aluminosilicate glass, other suitable types of glass can be used as well.

In one embodiment, the glass substrates 102 are heated at 380 degrees Celsius for about 2 hours. In one embodiment, the preselected temperature is in a range from about 320 to about 380 degrees Celsius. In one embodiment, the preselected duration is in a range from about 30 minutes to about 4 hours. In one embodiment, the glass substrates are made of aluminosilicate and the preselected temperature is about 370 degrees Celsius.

In several embodiments, the process then rapidly cools the glass substrate by applying a cool gas, by immersing the glass substrate in a cool liquid (e.g., water), or by using other suitable techniques for cooling hot glass substrates known in art. In one embodiment, the cooling period is about 30 minutes. In several embodiments, the cooling agent has a preselected temperature that is less than that of the glass substrate.

In one embodiment, the process can perform the sequence of actions in a different order. In another embodiment, the process can skip one or more of the actions. In other embodiments, one or more of the actions are performed simultaneously. In some embodiments, additional actions can be performed. In a number of embodiments, the solvent is water. In other embodiments, the solvent can be methanol, ethanol, or another suitable solvent.

Figure 3:
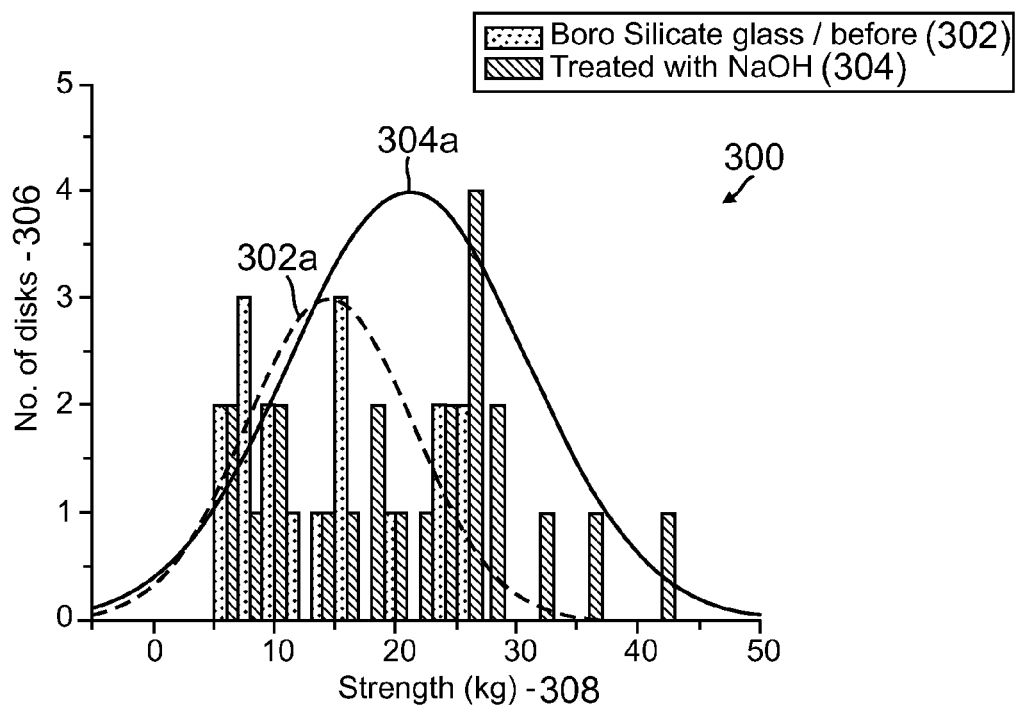
FIG. 3 is a Gaussian distribution graph illustrating the strength of borosilicate glass substrates before and after the glass substrates have been strengthened using one of the processes described herein in accordance with one embodiment of the invention.

FIG. 3 is a Gaussian distribution graph 300 illustrating the strength of borosilicate glass substrates before (302) and after (304) the glass substrates have been strengthened using one of the processes described herein in accordance with one embodiment of the invention. The graph 300 includes a vertical axis 306 representing the number of disks tested and a horizontal axis 308 representing the strength measured in kilograms. The normal or Gaussian distribution of the strength of untreated glass substrates is depicted by the curve 302a, while the normal or Gaussian distribution of the strength of glass substrates heat treated with NaOH is depicted by the curve 304a. The difference in the peaks of the curves indicates an increase in strength of about 50 percent for borosilicate glass substrates using one of the NaOH strengthening processes described herein.

Figure 4:
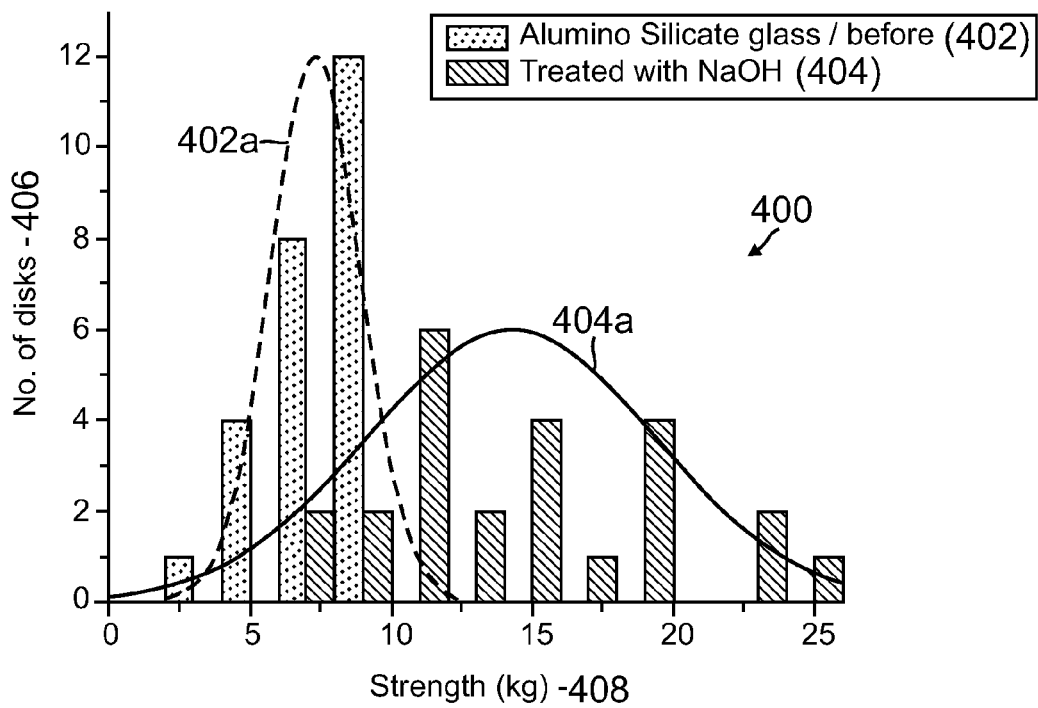
FIG. 4 is a Gaussian distribution graph illustrating the strength of aluminosilicate glass substrates before and after the glass substrates have been strengthened using one of the processes described herein in accordance with one embodiment of the invention.

FIG. 4 is a Gaussian distribution graph 400 illustrating the strength of aluminosilicate glass substrates before (402) and after (404) the glass substrates have been using one of the processes described herein in accordance with one embodiment of the invention. The graph 400 includes a vertical axis 406 representing the number of disks tested and a horizontal axis 408 representing the strength measured in kilograms. The normal or Gaussian distribution of the strength of untreated glass substrates is depicted by the curve 402a, while the normal or Gaussian distribution of the strength of glass substrates heat treated with NaOH is depicted by the curve 404a. The difference in the peaks of the curves indicates an increase in strength of about 100 percent for borosilicate glass substrates using one of the NaOH strengthening processes described herein.

Figure 5:
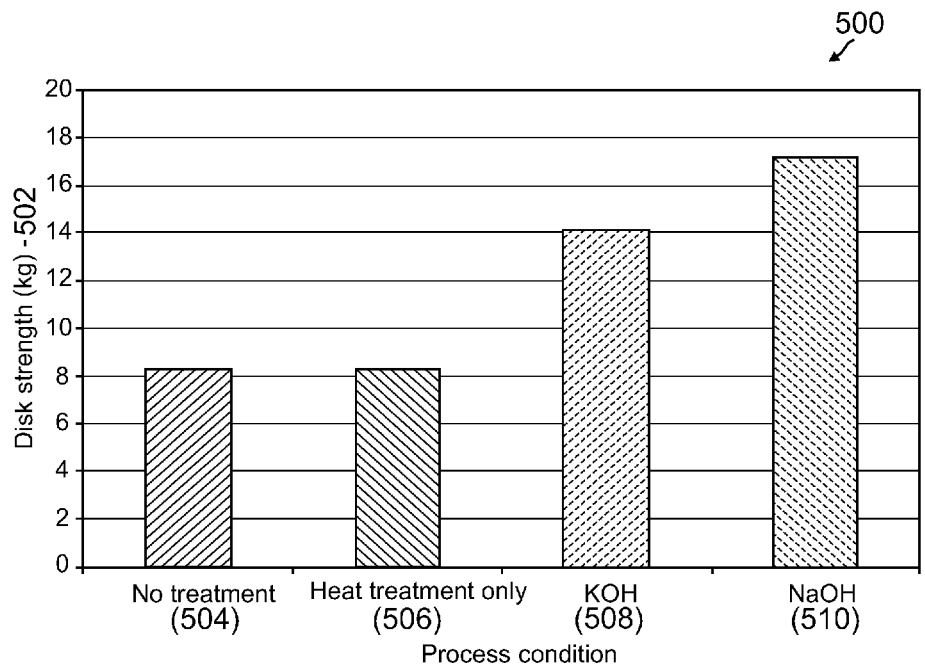
FIG. 5 is a bar chart illustrating the improvement in strength for aluminosilicate glass substrates treated using various processes described herein in accordance with one embodiment of the invention.

FIG. 5 is a bar chart 500 illustrating the improvement in strength for aluminosilicate glass substrates treated using various processes described herein in accordance with one embodiment of the invention. The bar chart 500 includes a vertical axis 502 representing the glass disk strength in kilograms. The bar chart 500 further includes vertical columns for each of the various processes including a process involving no treatment (504), a process using heat treatment only (506), a strengthening process using a solution including KOH (508), and a strengthening process using a solution including NaOH (510). The bar chart data indicates that the KOH process and NaOH process each substantially improve the strength of the glass substrates treated therewith.

Figure 6:
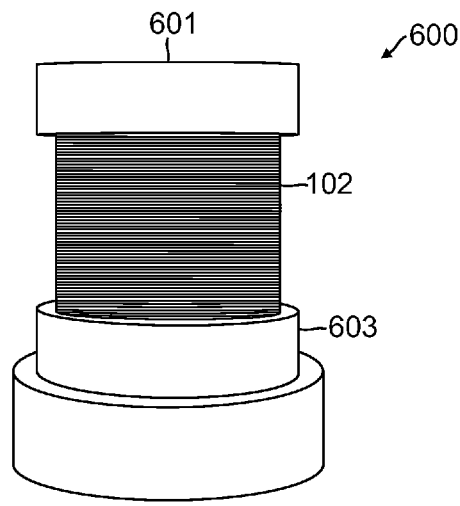
FIG. 6 is a perspective view of a stacked configuration of glass substrates that can be used in the heating stage of the processes of FIGS. 1a-1d and FIG. 2 instead of a spaced apart configuration in accordance with one embodiment of the invention.

FIG. 6 is a perspective view of a stacked configuration 600 of glass substrates 102 that can be used in the heating stage of the processes of FIGS. 1a-1d and FIG. 2 instead of a spaced apart configuration (e.g., second process cassette) in accordance with one embodiment of the invention. The stacked configuration 600 includes optical flats 601 and 603 that are positioned above and below a stack of the glass substrates 102 for maintaining the stacked configuration. The stacked configuration 600 can be placed in a heating chamber and heated at a preselected temperature for a preselected duration. In several embodiments, the stacked configuration can be used with the heating process stages described above for FIGS. 1a-1d and FIG. 2. As compared to the spaced apart configuration using a process cassette, the stacked configuration can provide better overall flatness in the resulting glass substrates. However, the stacked configuration may be more prone to allowing for creation of surface defects in the substrates than the spaced apart configuration.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for strengthening a glass disk substrate for a storage device, the method comprising:
    immersing at least a portion of the glass substrate in a solution, the solution consisting of a solvent and a coating material consisting of NaOH;
    removing the glass substrate from the solution;
    allowing the solvent to evaporate from the glass substrate; and
    heating the coating material on the glass substrate at a preselected temperature for a preselected duration, wherein the preselected temperature is sufficient to substantially melt the coating material and is less than a transition temperature of the glass substrate.

2. The method of claim 1, wherein the heating the coating material on the glass substrate at the preselected temperature for the preselected duration further comprises rapidly cooling the glass substrate.

3. The method of claim 2, wherein the rapidly cooling the glass substrate comprises immersing the glass substrate in a liquid, the liquid having a preselected temperature less than a temperature of the glass substrate.

4. The method of claim 2, wherein the rapidly cooling the glass substrate comprises applying a gas to the glass substrate for a preselected duration, the gas having a preselected temperature less than a temperature of the glass substrate.

5. The method of claim 4, wherein the preselected duration for applying the gas is about 30 minutes.

6. The method of claim 1, wherein the glass substrate comprises an aluminosilicate glass substrate.

7. The method of claim 1, wherein the glass substrate comprises a borosilicate glass substrate.

8. The method of claim 1, wherein the allowing the solvent to evaporate from the glass substrate comprises allowing the solvent to evaporate from the glass substrate, wherein the coating material forms a film on a surface of the glass substrate after the solvent has substantially evaporated.

9. The method of claim 1, wherein the preselected temperature is in a range of about 320 degrees Celsius to about 380 degrees Celsius.

10. The method of claim 1, wherein the preselected temperature is about 370 degrees Celsius.

11. The method of claim 1, wherein the preselected duration is in a range of about 30 minutes to about 240 minutes.

12. The method of claim 1, wherein the preselected duration is about 60 minutes.

13. The method of claim 1, further comprising:
    depositing at least one layer comprising magnetic material on the glass substrate, the at least one layer configured to be used for recording information.

14. The method of claim 1, wherein the glass substrate is configured for use within the storage device.

15. A method for strengthening a glass disk substrate for a storage device, the method comprising:
    immersing at least a portion of the glass substrate in a solution consisting of a solvent and a coating material consisting of NaOH;
    removing the glass substrate from the solution;
    allowing the solvent to evaporate from the glass substrate; and
    heating the coating material on the glass substrate at a preselected temperature for a preselected duration, wherein the preselected temperature is sufficient to substantially melt the coating material and is less than a transition temperature of the glass substrate,
    wherein the solvent is a material selected from the group consisting of water, methanol, and ethanol.

16. The method of claim 15, wherein the solvent is methanol.

17. The method of claim 15, wherein the solvent is ethanol.

18. The method of claim 15, wherein the solvent is water.

* * * * *